Patented Feb. 6, 1945

2,368,681

UNITED STATES PATENT OFFICE 2,368,681

ANTHRAQUINONE DYESTUFFS FAST TO ACID FADING

George W. Seymour and Victor S. Salvin, Cumberland, Md., assignors to Celanese Corporation of America, a corporation of Delaware No Drawing. Application October 12, 1943, Serial No. 506,008

7 Claims. (Cl. 8—40)

This invention relates to the manufacture of dyestuffs of the anthraquinone series and relates more particularly to the manufacture of dyestuffs which are valuable for the coloration of textile materials comprising organic derivatives of cellulose.

An object of our invention is the preparation of anthraquinone dyestuffs which yield valuable colorations on organic derivative of cellulose materials.

Another object of our invention is the preparation of anthraquinone dyestuffs which may be used for the coloration of organic derivative of cellulose materials to produce fast colors which are highly resistant to acid fading.

Other objects of our invention will appear from the following detailed description.

Many dyestuffs of the anthraquinone series which have been prepared are useful for the coloration of organic derivative of cellulose materials such as, for example, organic esters and organic ethers of cellulose. These anthraquinone dyestuffs have been obtained in numerous colors and among these various dyestuffs some of the most valuable are those derivatives which color organic derivative of cellulose materials in the various shades of blue.

A difficulty frequently encountered in the use of certain anthraquinone dyestuffs which color organic derivative of cellulose materials in various shades of blue is that while the colors are resistant to changes caused by the usual agencies which colored textile materials must withstand, for example, light and washing, they are not sufficiently resistant to the action of atmospheric gases such as those produced by the combustion of coal, gas, etc., and changes in shade frequently result when these colored materials are exposed thereto. In some cases the change produced is a dulling of the brightness of the color, while in other instances the colored material takes on a noticeably redder hue. Such changes in color constitute a distinct disadvantage and restrict the range of usefulness of these dyestuffs.

We have now discovered that anthraquinone dyestuffs which dye organic derivative of cellulose materials in desirable blue shades, and which are highly resistant to acid fading caused by atmospheric gases, may be obtained by the condensation of leuco anthraquinones selected from the group consisting of hydroxylamino-hydroxy-anthraquinones and amino-hydroxy-anthraquinones with an aliphatic aldehyde. Any suitable aliphatic aldehyde may be employed in the condensation reaction to form the novel dyestuffs of our invention and examples of the aldehydes which may be employed are formaldehyde, acetaldehyde, butyraldehyde and crotonaldehyde. The leuco hydroxylamino-hydroxy- and amino-hydroxy-anthraquinones employed in the condensation reaction are preferably those which are prepared by the reduction of the corresponding nitro-anthraquinones with alkaline agents such as sodium sulfide, stannous chloride and caustic soda, dextrose and caustic soda, or other alkaline reducing agents. Especially valuable dyestuffs may be obtained by employing those amino- and hydroxylamino-anthraquinone derivatives obtained by the reduction of 1,5-dinitro-anthrarufin, 2,4,6,8-tetranitro-anthraquinone or tetranitro-anthrarufin, and condensing the reduction products in leuco form with the aliphatic aldehydes.

The reduced nitro-anthraquinone compounds may be vatted to the leuco form in any manner well known in the art. Preferably, however, we reduce these compounds to the leuco form employing hydrosulfites such as sodium hydrosulfite. Other convenient methods of reducing the anthraquinone compounds to the leuco form which may be employed are, for example, zinc and sodium bisulfite, tin and hydrochloric acid, and aluminum and sulfuric acid.

The condensation of the aldehyde with the leuco hydroxylamino-hydroxy- or amino-hydroxy-anthraquinone is preferably carried out in stages. Thus, the reaction may be initiated by first reacting the compounds at temperatures of from 25 to 35° C. for from ½ to 1 hour and then at the end of this period raising the temperature to from 80 to 90° C. and holding the reaction mixture at about this temperature for 2 to 4 hours. The reaction mixture is preferably maintained at elevated temperature until the leuco compound is oxidized since improved yields are thereby obtained. At this point the dyestuff which has formed by the condensation reaction precipitates from solution. Preferably, the amino-hydroxy- or hydroxylamino-hydroxy-anthraquinone compound is converted to the leuco form and then, without separating the leuco compound from the reaction mixture in which it has been reduced, the desired aldehyde is added to the solution, and the condensation reaction then carried out. Usually, from 2 to 10 mols of the aldehyde may be employed during the condensation for each mol of the leuco anthraquinone. Optimum results are achieved, however, employing about 4 mols of the aldehyde to about 1 mol of the leuco anthraquinone.

The dyestuffs formed in accordance with our novel process may be applied to the organic derivative of cellulose materials by any convenient manner of application such as dyeing, printing, stencilling or other method of local application. They may also be applied in solution with the aid of an organic solvent or they may be applied in the form of aqueous suspensions or dispersions.

The coloring matters of our invention are particularly applicable for the coloration of organic derivative of cellulose materials such as cellulose esters and cellulose ethers. Examples of such esters are cellulose acetate, cellulose propionate, cellulose butyrate and mixed esters such as cellulose aceto-propionate and cellulose aceto-butyrate. Examples of cellulose ethers are ethyl cellulose and benzyl cellulose. The dyestuffs may also be applied to mixed materials containing one or more of the organic derivatives of cellulose above and other textile fibers such as cotton, silk, wool or artificial fibers such as regenerated cellulose. These materials may be colored by the same dyestuffs as the organic derivative of cellulose materials when said dyestuffs have an affinity for the materials, or they may be colored in the same or in different shades by means of other dyestuffs, before, after or simultaneously with the coloration of the cellulose esters or ethers.

In order further to illustrate our invention but without being limited thereto, the following examples are given:

*Example I*

20 parts by weight of crude 4,8-dinitro-anthrarufin powder are slurried into 300 parts by weight of water and, while the temperature is maintained at 20° C., a solution of 70 parts by weight of technical fused sodium sulfide in 200 parts by weight of water is added to the slurry over the course of about 30 minutes. The reaction mixture is stirred at 20° C. for about 1 hour to complete the reduction of the 4,8-dinitro-anthrarufin to the corresponding 4,8-di-hydroxylamino-anthrarufin. The latter is then filtered from solution, washed with 500 parts by weight of an aqueous 3% solution of sodium hydroxide, and this washing is followed by a wash with 1000 parts by weight of water. The 4,8-di-hydroxylamino-anthrarufin is removed from the filter press as a paste comprising 11% by weight of the reduced anthrarufin compound and 89% of water. To convert the 4,8-di-hydroxylamino-anthrarufin to the leuco form, 100 parts by weight of the 11% paste are first slurried into 200 parts by weight of water at 25° C. and then 15 parts by weight of sodium hydroxide dissolved in 50 parts by weight of water are added, followed by the addition of a solution of 30 parts by weight of sodium hydrosulfite dissolved in 90 parts by weight of water. The resulting mixture is stirred slowly over the course of 30 minutes at a temperature of 30 to 35° C. and this treatment effects the conversion of the 4,8-di-hydroxylaminoanthrarufin to the leuco form.

This leuco compound is subjected to the aldehyde composition to form the desired dyestuff in the following manner, without separating it from the solution in which it is formed. 25 parts by weight of formaldehyde in the form of a 25% aqueous solution are added slowly to the leuco compound over the course of 20 minutes while maintaining the temperature of the reaction mixture at about 30° C. The reaction mixture turns reddish purple in color on the addition of the aldehyde and the mixture is held at a temperature of 30 to 35° C. for 1 hour during which time little change in color is observed. The mixture is then heated with stirring at 90 to 95° C. for 2 hours, whereupon the mixture turns a blue color and the dyestuff which has formed precipitates from solution. The dyestuff is filtered at 50° C., thoroughly washed with water and removed from the filter press as a paste containing 24% by weight of the dyestuff and 76% by weight of water. When applied to cellulose acetate or other organic derivative of cellulose materials this dyestuff yields materials dyed in desirable blue shades which are extremely fast to fading when subjected to the action of an atmosphere containing combustion gases.

*Example II*

20 parts by weight of crude 4,8-dinitro-anthrarufin are slurried into 200 parts by weight of water at 80° C. and a solution of 90 parts by weight of sodium sulfide is added to the slurry over 30 minutes to effect a reduction of the 4,8-dinitro-anthrarufin to the corresponding diamino-anthrarufin. The reduction is completed by heating the reaction mixture to a temperature of 80 to 85° C. and maintaining it at this temperature for about 3 hours. The 4,8-diamino-anthrarufin is then filtered from the suspension and washed with 1000 parts by weight of water. The 4,8-diamino-anthrarufin is then removed from the filter press as a paste containing 17% by weight of the reduced anthrarufin compound and 83% of water.

To convert the 4,8-diamino-anthrarufin to the leuco form 90 parts by weight of the 17% paste are slurried into 200 parts by weight of water at 30° C. and then 12 parts by weight of sodium hydroxide dissolved in 50 parts by weight of water are added, which is followed by the addition of a solution of 25 parts by weight of sodium hydrosulfite dissolved in 75 parts by weight of water. The resulting mixture is stirred slowly over the course of 30 minutes at a temperature of 30 to 35° C. to effect the conversion of the 4,8-diamino-anthrarufin to its leuco form.

This leuco compound is subjected to the aldehyde condensation to form the desired dyestuff in the following manner, without separating it from the solution in which it is formed. 20 parts by weight of formaldehyde in the form of a 25% aqueous solution are added slowly to the leuco compound over the course of 20 minutes while maintaining the temperature of the reaction mixture at about 30° C. The olive reaction mixture turns a bluish red in color on the addition of the aldehyde and the mixture is held at a temperature of 30 to 35° C. for one hour during which time litle change in color is observed. The reaction mixture is then heated with stirring at 90° C. to 95° C. for 3 hours whereupon the mixture turns a blue color and the dyestuff which has formed precipitates from solution. The dyestuff is filtered at 50° C., washed with water and is removed from the filter press as a paste containing 19% by weight of the dyestuff and 81% by weight of water. When applied to cellulose acetate or other organic derivative of cellulose materials this dyestuff yields materials dyed in desirable blue shades which are extremely fast to fading when subjected to the action of an atmosphere containing combustion gases.

It is to be understood that the foregoing detailed description is given merely by way of illustration and that many variations may be made therein without departing from the spirit of our invention.

Having described our invention, what we desire to secure by Letters Patent is:

1. Process for the production of anthraquinone dyestuffs fast to acid fading, which comprises condensing an aliphatic aldehyde with a substance selected from the group consisting of 4,8-di-hydroxylamino-anthrarufin and 4,8-di-amino-anthrarufin, the condensation being carried out with the anthrarufin compound in leuco form.

2. Process for the production of anthraquinone dyestuffs fast to acid fading, which comprises condensing formaldehyde with a substance selected from the group consisting of 4,8-di-hydroxylamino-anthrarufin and 4,8-diamino-anthrarufin, the condensation being carried out with the anthrarufin compound in leuco form.

3. An anthraquinone dyestuff fast to acid fading produced by condensing an aliphatic aldehyde with a substance selected from the group consisting of 4,8-di-hydroxylamino-anthrarufin and 4,8-diamino-anthrarufin, the condensation being carried out with the anthrarufin compound in leuco form.

4. An anthraquinone dyestuff fast to acid fading produced by condensing formaldehyde with a substance selected from the group consisting of 4,8-di-hydroxylamino-anthrarufin and 4,8-di-amino-anthrarufin, the condensation being carried out with the anthrarufin compound in leuco form.

5. The process of coloring organic derivative of cellulose material, which comprises applying thereto an anthraquinone dyestuff which is produced by condensing an aliphatic aldehyde with a substance selected from the group consisting of 4,8-di-hydroxylamino-anthrarufin and 4,8-di-amino-anthrarufin, the condensation being carried out with the anthrarufin compound in leuco form.

6. The process of coloring cellulose acetate material, which comprises applying thereto an anthraquinone dyestuff which is produced by condensing an aliphatic aldehyde with a substance selected from the group consisting of 4,8-di-hydroxylamino-anthrarufin and 4,8-di-amino-anthrarufin, the condensation being carried out with the anthrarufin compound in leuco form.

7. The process of coloring cellulose acetate material, which comprises applying thereto an anthraquinone dyestuff which is produced by condensing formaldehyde with a substance selected from the group consisting of 4,8-di-hydroxylamino-anthrarufin and 4,8-diamino-anthrarufin, the condensation being carried out with the anthrarufin compound in leuco form.

GEORGE W. SEYMOUR.
VICTOR S. SALVIN.